March 23, 1965    J. B. CHAPLIN    3,174,573
GROUND EFFECT MACHINE

Filed May 13, 1963    6 Sheets-Sheet 1

INVENTOR.
JOHN B. CHAPLIN
BY
*Beau, Brooks, Buckley & Beau*
ATTORNEY

March 23, 1965  J. B. CHAPLIN  3,174,573
GROUND EFFECT MACHINE

Filed May 13, 1963 6 Sheets-Sheet 2

INVENTOR.
JOHN B. CHAPLIN
BY
*Beau, Brooks, Buckley & Beau*
ATTORNEY

INVENTOR.
JOHN B. CHAPLIN

March 23, 1965 J. B. CHAPLIN 3,174,573
GROUND EFFECT MACHINE
Filed May 13, 1963 6 Sheets-Sheet 4
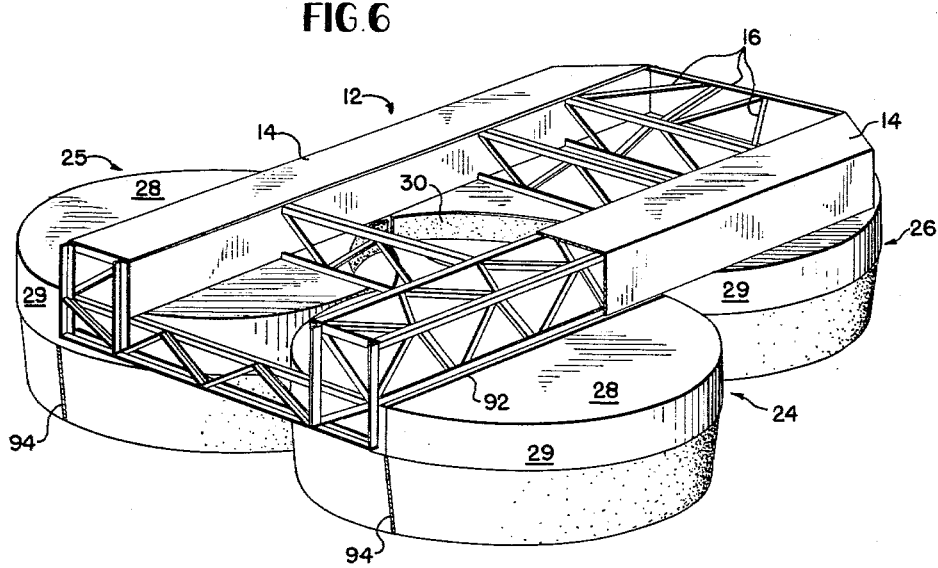
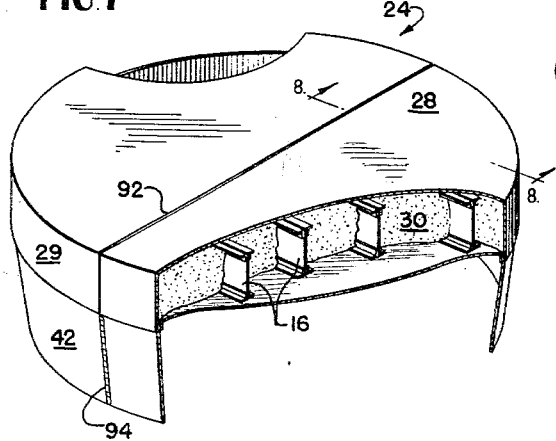
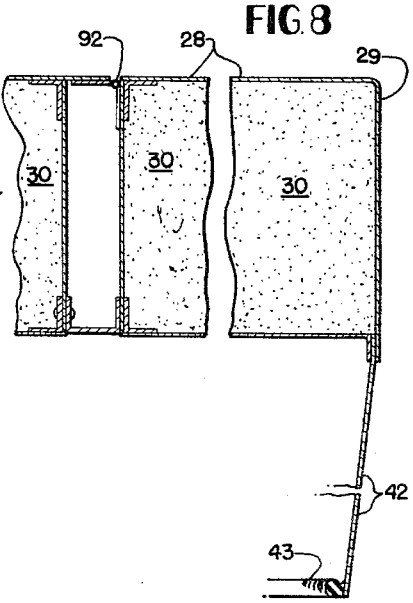
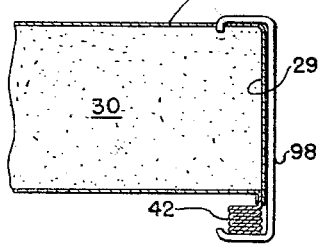
INVENTOR.
JOHN B. CHAPLIN
BY
Beau, Brooks, Buckley & Beau.
ATTORNEY March 23, 1965  J. B. CHAPLIN  3,174,573
GROUND EFFECT MACHINE Filed May 13, 1963  6 Sheets-Sheet 5

INVENTOR.
JOHN B. CHAPLIN
BY
Beau, Brooks, Buckley & Beau.
ATTORNEY

March 23, 1965   J. B. CHAPLIN   3,174,573
GROUND EFFECT MACHINE
Filed May 13, 1963   6 Sheets-Sheet 6
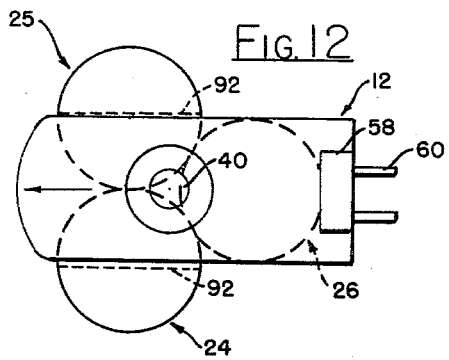
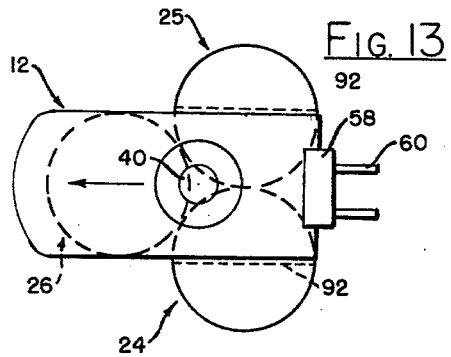
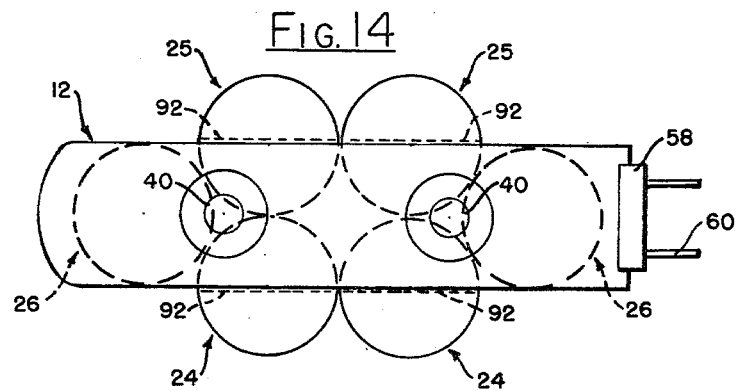
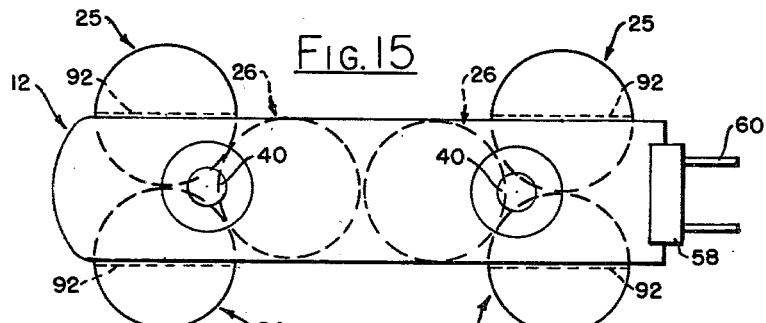
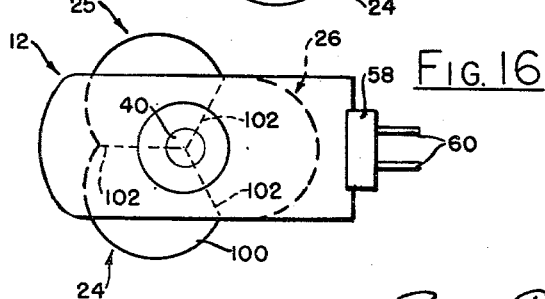
INVENTOR.
JOHN B. CHAPLIN
BY
*Beau, Brooks, Buckley & Beau,*
ATTORNEYS

3,174,573
GROUND EFFECT MACHINE
John Bradley Chaplin, Tonawanda, N.Y., assignor to Bell Aerospace Corporation, Wheatfield, N.Y.
Filed May 13, 1963, Ser. No. 279,900
5 Claims. (Cl. 180—7)

This invention relates in general to dirigible vehicles such as are supported by cushions of air formed beneath the machines. Such vehicles are commonly known in the art as "ground effect machines" even though they may also be used to travel over water.

It is now known in this art that the efficiency of vehicles of this type depend upon their relatively large plan form which gives substantial area to the effective ground cushion, thus reducing the effective air pressure required. This, in turn, reduces the requisite weight of the lift-producing means, which weight saving is utilized for payload. Hence, such a vehicle may have an overall weight far in excess of the thrust produced by the lifting fan-engine combination; but previous machines of this type have been impracticably large in planform and otherwise cumbersome, and operable only over relatively smooth water or unobstructed level ground.

A primary object of the present invention is to provide an improved ground effect machine as aforesaid which is capable of travel over narrow areas such as roads or canals; as well as over rivers, swamps and typical cross-country terrain while being substantially unhampered by obstacles such as floating logs or terrain slopes, to a degree heretofore unheard of.

Another object of the invention is to provide a vehicle of the type mentioned above, which can be readily folded into a compacted configuration for transport by boat or train, or for towing on a highway or the like; while still having when unfolded into operative condition the load-carrying capabilities of a large machine as explained hereinabove. The above objects and advantages may be embodied in vehicles such as are shown by way of example in the accompanying drawings, wherein:

FIG. 6 is a view corresponding to FIG. 1 but of the vehicle substructure only;

FIG. 7 is a disassembled perspective view, with portions broken away to show the interior construction, of one of the lift cells of the vehicle;

FIG. 8 is an enlarged scale fragmentary sectional view taken on the plane of line 8—8 of FIG. 7;

FIG. 9 is a fragmentary sectional view of an edge portion of a lift cell showing the cell skirt held in retracted position by clamp means;

FIG. 12 is a diagrammatic planform illustration of the machine of FIGS. 1–11, inclusive; and FIGS. 13–16 are views corresponding to FIG. 12 showing modified forms of machine arrangements embodying features of the present invention.

Figure 1:
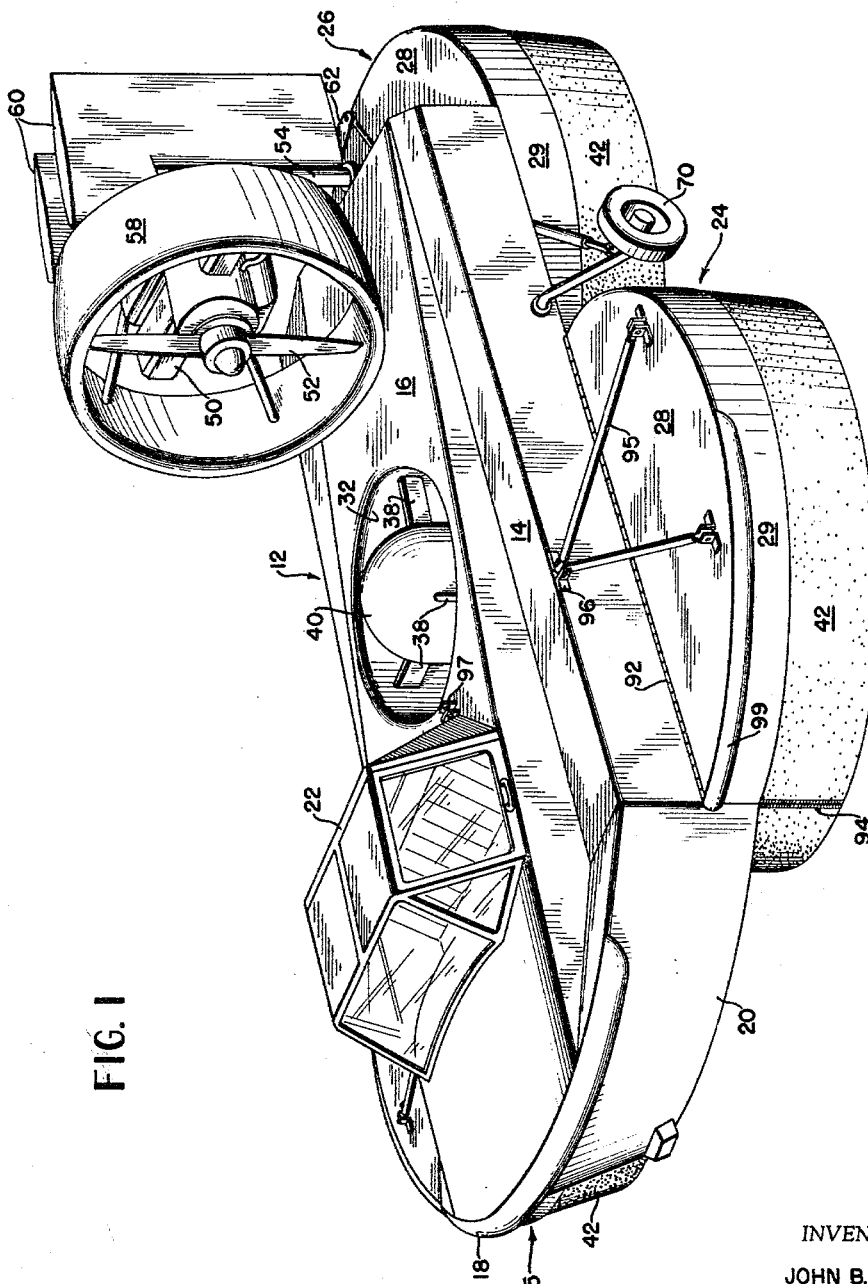
FIG. 1 is a three-quarter top-front perspective view of one form of machine of the invention, showing the air lift cells thereof in extended operative positions.

As shown in FIGS. 1–12 of the drawings herewith, the machine of the invention may be constructed to include a hull structure 12 of platform like construction such as may be conveniently fabricated of metal, wood, plastic, or the like; and to include a top deck having walkway portions 14—14, supported by structural members as indicated at 16 (FIG. 6). A centrally disposed raised deck portion 16 is provided to run longitudinally of the hull terminating at its front end in a curved bow portion 18 below which extends a curved bow plate 20. A passenger cockpit as indicated at 22 is provided to accommodate the vehicle operator and/or passengers, and incorporates suitable seating arrangements and control devices as illustrated for example in FIGS. 5, 10, 11.

Three separate cylindrical cells of pancake form are suspended from the hull proper as indicated at 24, 25, 26; each of said cells being of inverted cup-shaped form and each comprising a top plate portion 28 and a downturned perimetral flange 29. As indicated at 30, (FIGS. 4–9) the interiors of the cells 24, 25, 26 and other portions of the hull structure may be filled with foamed plastic or air-inflated bags or the like, to render the vehicle buoyant when resting on water.

Figure 2:
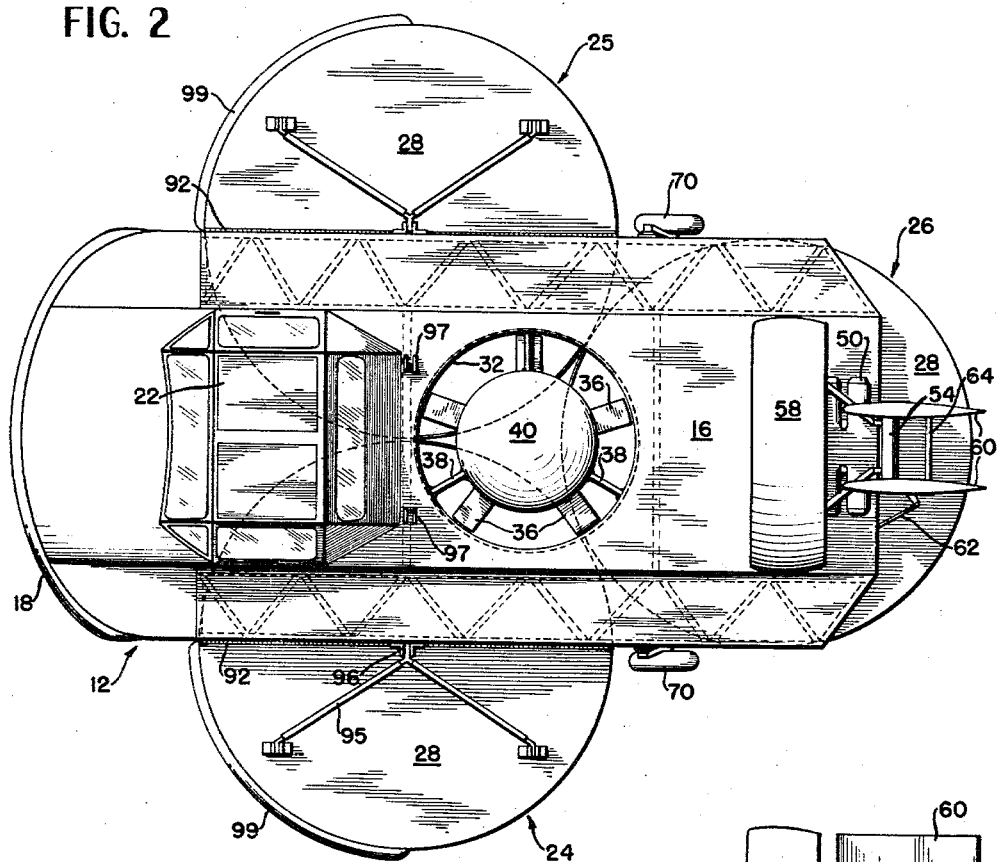
FIG. 2 is a top plan view thereof.
Figure 3:
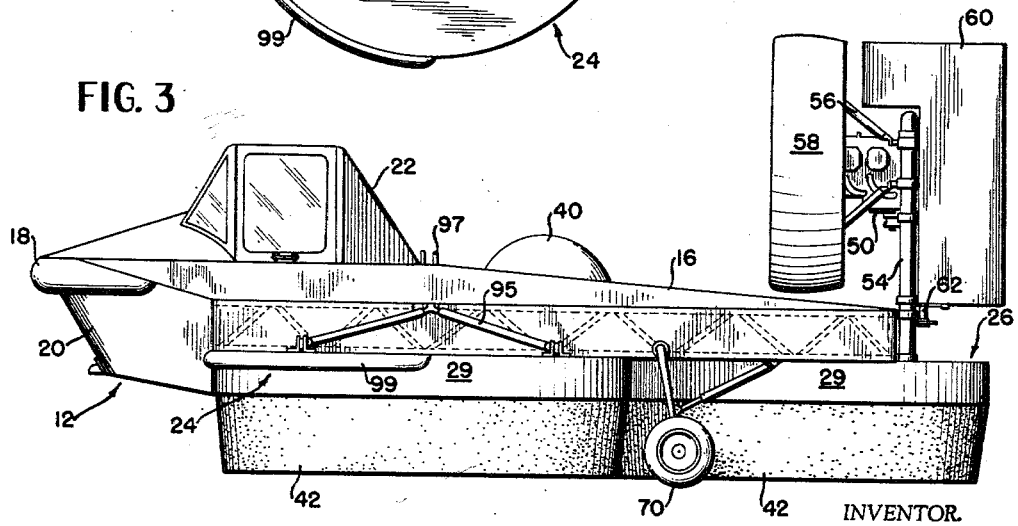
FIG. 3 is a side elevation thereof.
Figure 4:
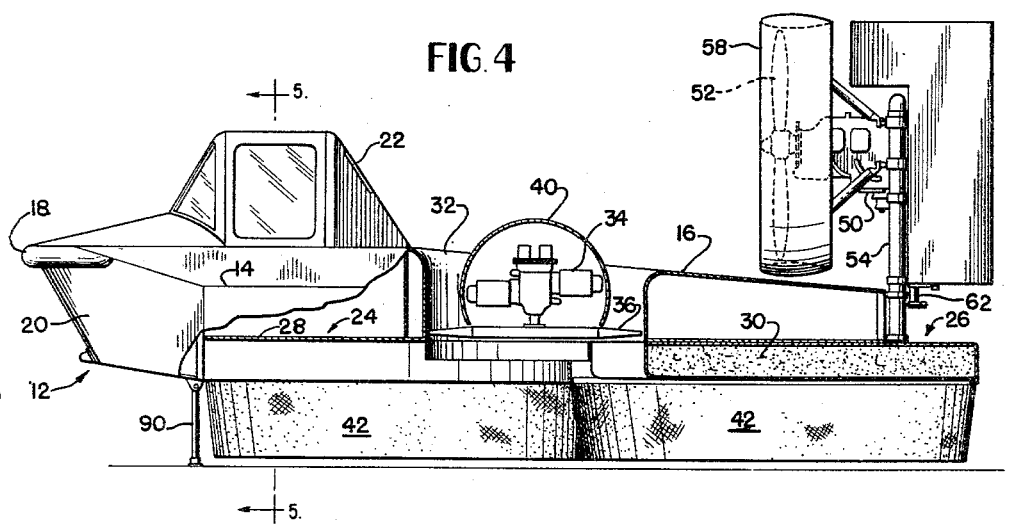
FIG. 4 is a view corresponding to FIG. 2 but with portions broken away to provide a parti vertical sectional view.

As shown best in FIG. 2, the cells are mounted to extend below the hull in a clover leaf planform arrangement; two of the cells being oppositely disposed on a center line running transversely of the longitudinal centerline of the vehicle, while the third cell is nested tangentially to the rear thereof and centered on the vehicle longitudinal centerline. As shown in FIGS. 2–4, the upper deck structure 16 is formed with a vertically extending well as indicated at 32 which is centered over the triangular shaped space between the nested cells 24, 25, 26. An engine 34 and a fan 36 are mounted as a unit within the well 32 as by means of struts 38 (FIGS. 1, 2) for driving air downwardly through the well 32. A streamlined cowling as indicated at 40 is preferably provided to enclose the engine 34 thereby leaving an annular passageway between the cowling 40 and the cylindrical wall of the well 32, whereby the fan 36 is operable in the well known manner of the ducted-fan technique.

The cells 24, 25, 26 are provided with downwardly depending flexible skirt portions 42, and the top plate portion 28 of the cells and the flotation fillings are cut away throughout the plan view areas which are congruent to the plan form of the fan well 32. Thus it will be appreciated that operation of the engine 34 will drive the fan 36 to push air downwardly through the well 32 and into the open cell-like compartments formed within the skirts 42 below the cell members 24, 25, 26. Thus, air cushions will be generated therein, operating to levitate the vehicle in the ground effect machine manner. The skirts 42 may be fabricated so as to cause their side wall profiles to slope somewhat inwardly, and the bottom marginal edge of each skirt is preferably formed with a stiffening bead 43 (FIG. 8) to assist in maintaining its cell form.

Forward propulsion and directional guidance of the vehicle are provided by means of a fan and rudder arrangement at the stern. Thus, as shown in the drawing herewith an engine 50 carrying a propeller 52 is mounted on a vertical pylon 54, and a cowling 58 is carried by means of brace struts 56 to envelope the fan 52, to enhance the performance thereof and at the same time to provide a fan-guard for personnel working with the vehicle. Vertical rudders as indicated at 60, 60 are hingedly mounted on the pylon 54 and are controlled to pivot thereon as by means of control linkage indicated at 62; the rudders 60—60 being interconnected by a tie-rod 64 (FIGS. 2, 10) to insure operation in unison. Thus, it will be appreciated that operation of the engine 50 will cause the propeller 52 to provide a propulsion effect, and that the direction of vehicle travel may be readily controlled by appropriate actuation of the rudder system.

Figure 5:
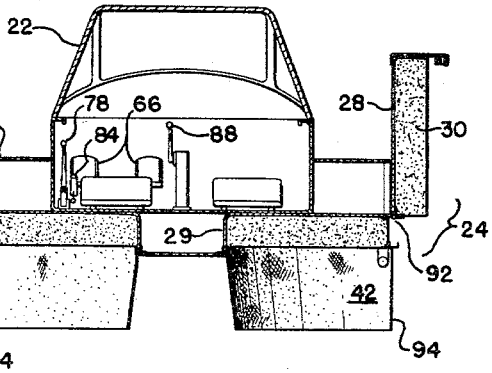
FIG. 5 is a section taken on the plane of line 5—5 of FIG. 4, but showing one of the lift cells on folded-back position.
Figure 10:
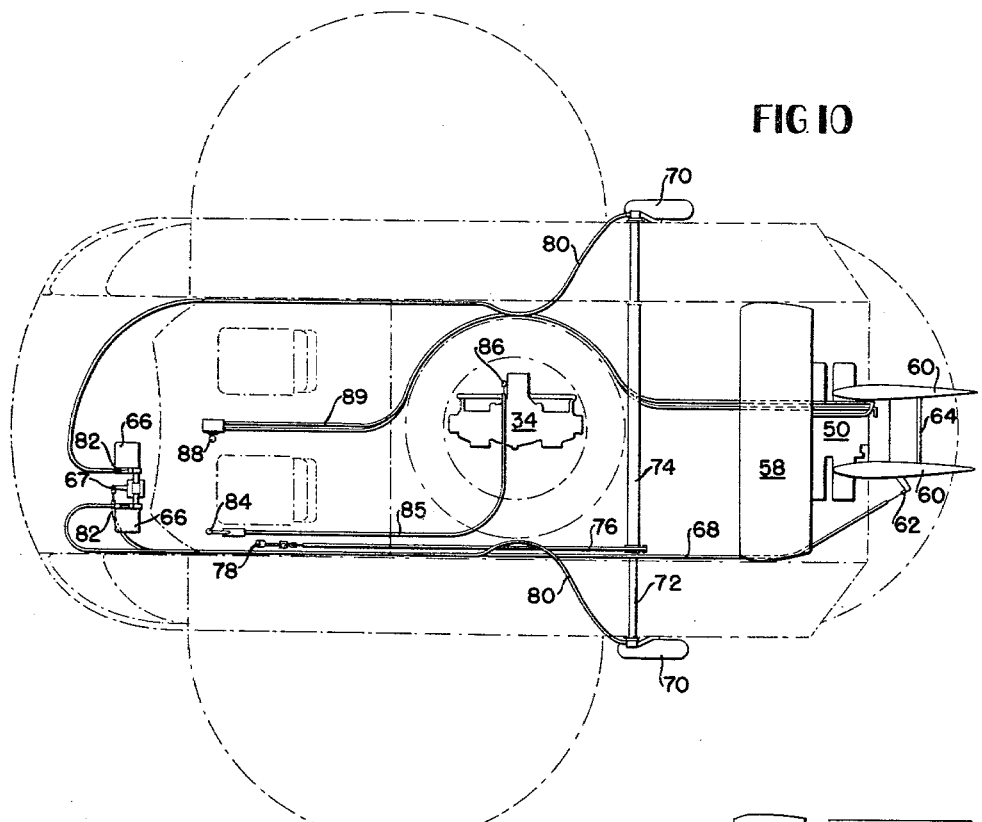
FIGS. 10, 11 are plan and side elevational views, respectively, showing a typical control system for the vehicle.
Figure 11:
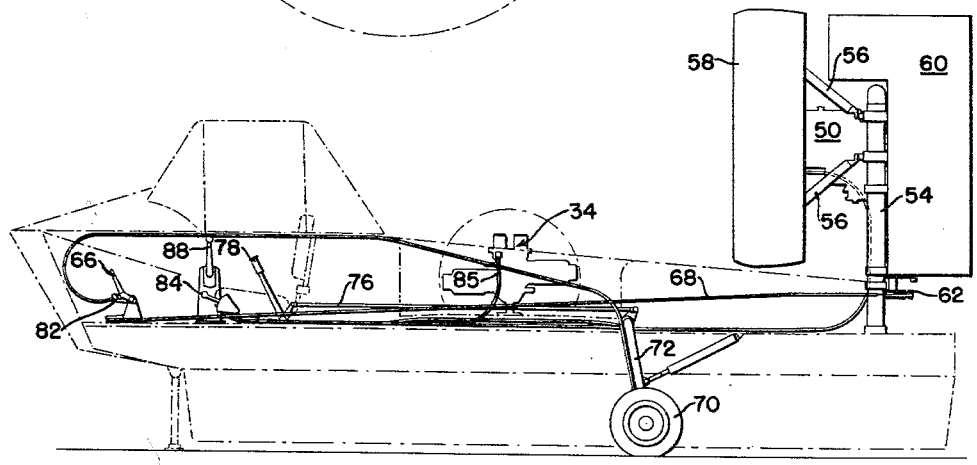

As illustrated in FIGS. 5, 10, 11, the operator controls for the vehicle include rudder pedals 66—66 actuating a crank arm 67 controlling a Bowden cable system 68 leading to the rudder control linkage 62. A retractible ground wheel system may also be provided as illustrated to comprise a pair of wheels 70—70 carried by an inverted U-shaped torsion bar suspension device 72; the suspension bar being journalled in a bearing 74 and arranged to be rotatable therein for wheel retraction purposes under control of a push-pull rod system 76 and a hand lever 78. The wheels 70—70 are preferably equipped with brakes arranged to be actuated as by Bowden cables 80—80 leading to control pedals 82—82 carried by the rudder pedals 66—66.

The lift producing engine-fan unit is arranged to be controlled by means of a throttle lever as indicated at 84 through means of a Bowden cable 85 connected to the engine carburetor 86. The propulsion engine-propeller unit is shown to be controllable by means of a pilot lever 88, through means of either hydraulic or Bowden type control motion transmitting systems as indicated at 89. It is to be understood that the propeller 52 as well as the fan 36 may be of the adjustable pitch type if desired, and appropriate supplemental controls therefor will of course be provided in that case. It will also be understood that the brake pedals 82—82 may be pilot-operated either in unison for straight braking purposes; or selectively, for steering the vehicle when trundling along a highway or the like.

Thus, it will be appreciated that the vehicle may be operated through throttle control of the engine 34 to regulate the height of the vehicle above the operating ground or water surface, as the case may be; and that upon closing of the throttle the vehicle will settle down upon such surface. The wheels 70—70 and a retractible nose strut as indicated at 90 (FIG. 4) are employed to maintain the vehicle at a suitable elevation so as to protect the flexible skirt devices 42 from abrasion contacts with the ground surface.

It will be noted that, as viewed in plan form, the air cushion system of the machine of FIGS. 1–12 comprises two transversely opposite air cells and a rearwardly disposed air cell symmetrically disposed of the longitudinal centerline of the vehicle. Thus, with equal distribution of lift producing air to the three cells, an inherently stable lift system is thereby provided. Location of the lift producing air duct 32 directly over the region of intercontiguity of the three cells insures equal distribution of air thereinto. This eliminates the possibility of out-of-balance effects such as are experienced for example whenever a multiplicity of fans are used in conjunction with separate cells.

It is another particular feature of the present invention that provision is made for substantially reducing the overall width dimension of the vehicle, to facilitate trundling of the vehicle along a highway or the like, and in connection with garaging, or other transportation or storage problems. For this purpose the laterally extending cells 24, 25 are constructed to be hingeable as indicated at 92 alongside the corresponding side walls of the hull structure of the vehicle. Furthermore, the skirt devices 42 thereof are appropriately slit and furnished with slide fasteners or the like as indicated at 94 at the front and the rear ends of the hinge lines. Thus, it will be appreciated that whenever the lift system is inoperative and in order to prepare the vehicle for transportation or storage wherever only narrow spaces are available, the fastener devices 94 will be opened, thus freeing the outboard portions of the lift cells 24, 25 to be folded upwardly and into vertical standing positions parallel to the sides of the hull; as shown for example at the right hand portion of FIG. 5 of the drawing herewith.

Diagonal brace devices such as indicated at 95 may be employed to brace the outboard sections of the cell structures in operative positions, and may be disconnected from the holding brackets 96 (FIGS. 1–3) and reconnected to inboard brackets 97 for stabilizing the folded portions of the cells in vertically standing positions. As shown in FIG. 9, when the slide fasteners 94 are opened the skirt devices may be conveniently folded and compacted against the rigid top portions of the cells and clamped thereagainst as by means of metal clamps 98 slip-fitted into position as shown. Preferably, as shown in FIGS. 1–3, the frontally presented top edges of the cell structures 24, 25 are provided with protruding bumper portions 99 to reinforce these parts against operational hazards.

Thus it will be understood that the vehicle of the invention is adapted for amphibious operations and may rest with equal facility either upon ground or water surfaces. The wheels 70—70 and the nose strut 90 are normally retracted, and when the air supply fan unit is inoperative the skirt devices may simply fold under the hull. Then when the fan unit is operated it creates within each skirt-cell unit an air cushion operating to lift the vehicle clear of the previously supporting surface, and maneuvering of the craft by the propulsion and steering controls as explained hereinabove may proceed.

While operating over relatively smooth ground or water the skirt cells maintain their balloon configurations as shown in the drawing. Whenever an obstacle such as a floating log or rough terrain is encountered by the skirts they simply fold under and wipe over the obstacle while continuing to seal off the aircell; whereby the interior air pressures are maintained and continue to support the vehicle. The air pressure forces as well as the beads 43 around the bottom edges of the skirts cooperate to cause them to return to their normal cylindrical shapes after each encounter with such obstacle. Thus, it will be appreciated that the vehicle of the invention is adapted to successful operation over much rougher terrain than the case of prior art arrangements, and may be driven for example at full speed over relatively rough water and up upon sloping shore lines or the like without disastrous results.

Referring now to FIGS. 12–13 herein, it will be noted that FIG. 12 diagrammatically illustrates the general arrangement of the machine as shown in FIGS. 1–11, and as described in detail hereinabove. FIG. 13 illustrates, however, that the general configuration may in a sense be reversed, in that the single cell 26 on the longitudinal center line of the hull may be disposed under the bow end of the machine while the transversely paired cells 24, 25 are disposed therebehind. Operational equilibrium and maneuvering performances may, of course, be attained by appropriate control of the functional variables, as explained hereinabove in connection with the form of FIGS. 1–11.

FIGS. 14 and 15 illustrate still further possible modifications of the general configuration, and illustrate how multiples of the tri-cell units may be used in a single machine. As shown herein, each tri-cell unit will be supplied with air from a centrally located duct which may either be supplied by its own engine-fan unit, or by a manifold leading from a central engine-fan unit, as preferred.

FIG. 16 diagrammatically illustrates a modification of the tri-cell unit form of the machine illustrated in FIGS. 1–11, and shows how the three air cells may be formed by fabricating a cell unit to comprise a peripheral wall 100 of scalloped planform while subdividing the interior by means of straight line partitions 102 running radially inwardly toward the center of the unit. The air pressure within the cell unit will in any case provide constant peripheral tension against the cell walls.

In all cases it will be noted that each tri-cell unit is supplied with air through means of a duct disposed over and leading into the space at the plan view center of the tri-cell unit, whereupon the air distributes radially into the cells to form air cushions therebelow. Also, note that in each case the side-by-side cell units are constructed so that their portions which extend laterally beyond the hull plan form may be hinged upwardly so as to narrow down the overall beam dimension of the vehicle, to facilitate transport and storage thereof.

I claim:
1. A ground effect machine comprising,
   an elongate frame having a vertical well centered on the longitudinal axis of the frame,
   a pair of disc-like buoyant bodies disposed in symmetrical side-by-side relation on either side of said longitudinal axis,
   a third disc-like buoyant body adjacent said pair but centered on said longitudinal axis,
   a circular flexible skirt depending marginally from each of said bodies to define, therewith, an air cushion-maintaining cell,
   said well being positioned to overlie adjacent portions of the three bodies and such portions of the bodies being cut away so that said well leads directly into each cell,
   and fan means positioned within said well for directing air into said cells.

2. A ground effect machine comprising,
   an elongate frame having a vertical well centered on the longitudinal axis of the frame,
   a pair of disc-like buoyant bodies disposed in symmetrical side-by-side relation on either side of said longitudinal axis,
   a third disc-like buoyant body adjacent said pair but centered on said longitudinal axis,
   a circular flexible skirt depending marginally from each of said bodies to define, therewith, an air cushion-maintaining cell,
   said well being positioned to overlie adjacent portions of the three bodies and such portions of the bodies being cut away so that said well leads directly into each cell,
   and fan means positioned within said well for directing air into said cells,
   each body of said pair being divided into a pair of sections along a line generally parallel to said longitudinal axis,
   hinge means joining said sections with the inboard of such sections being fixed to said frame while the outboard sections are free to be swung to substantially vertical, out-of-the-way positions,
   said skirts being detachably joined along the line of separation between said sections.

3. The ground effect machine according to claim 1 wherein said frame includes an upstanding pylon,
   a ducted fan assembly mounted on said pylon and having a substantially horizontal axis of rotation,
   and a rudder assembly pivotally mounted in the path of air blast from said ducted fan.

4. A ground effect machine comprising, in combination,
   a body having a vertically disposed inlet well having an open bottom,
   a plurality of cell members adapted to support said body by superatmospheric air cushions formed in said cell members, each cell member having a top, and said cell members being disposed in closely spaced relation,
   the open bottom of said well being positioned to overlie adjacent portions of said tops of the cell members and such portions of said tops being open so that said well leads directly downwardly into each cell member,
   and means for forcing air downwardly through said well and into said cell members to form superatmospheric air cushions therein.

5. A ground effect machine comprising, in combination,
   an elongate body having a vertical well centered on the longitudinal axis of the body,
   a pair of cell members disposed in symmetrical side-by-side relation on either side of said longitudinal axis, a third cell member adjacent said pair but centered on said longitudinal axis, each of said cell members having a top, and said cell members being adapted to support said body by superatmospheric air cushions formed in said cell members,
   said well being positioned to overlie adjacent portions of said tops of the cell members and such portions of the tops being open so that said well leads directly downwardly into each cell member,
   and means for forcing air downwardly through said well and into said cell members to form superatmospheric air cushions therein.

References Cited by the Examiner
UNITED STATES PATENTS

| | | | |
|---|---|---|---|
| 2,834,560 | 5/58 | Werner | 244—23 |
| 3,055,446 | 9/62 | Vaughen | 114—67.1 |
| 3,078,939 | 2/63 | Bollum | 180—7 |
| 3,083,936 | 4/63 | Rethorst | 244—49 |
| 3,095,938 | 7/63 | Bertelsen | 180—7 |
| 3,106,260 | 10/63 | Bollum | 180—7 |

FOREIGN PATENTS 1,238,499   7/60   France.

FERGUS S. MIDDLETON, *Primary Examiner.*
MILTON BUCHLER, *Examiner.*